Aug. 12, 1924.
C. DOERING ET AL
1,504,221
BUTTER WORKING AND PRINT MACHINE
Filed Jan. 23, 1922     2 Sheets-Sheet 2
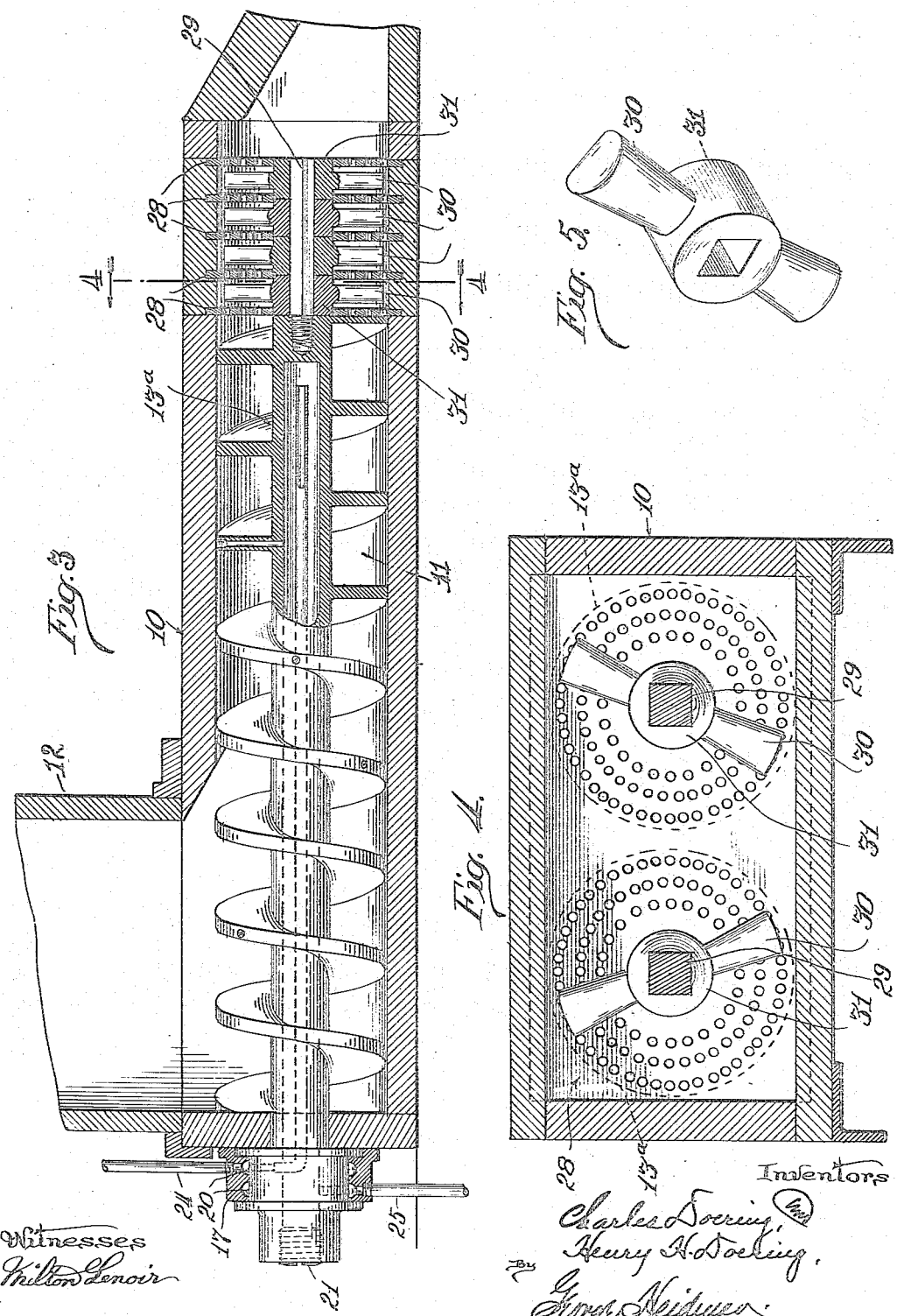

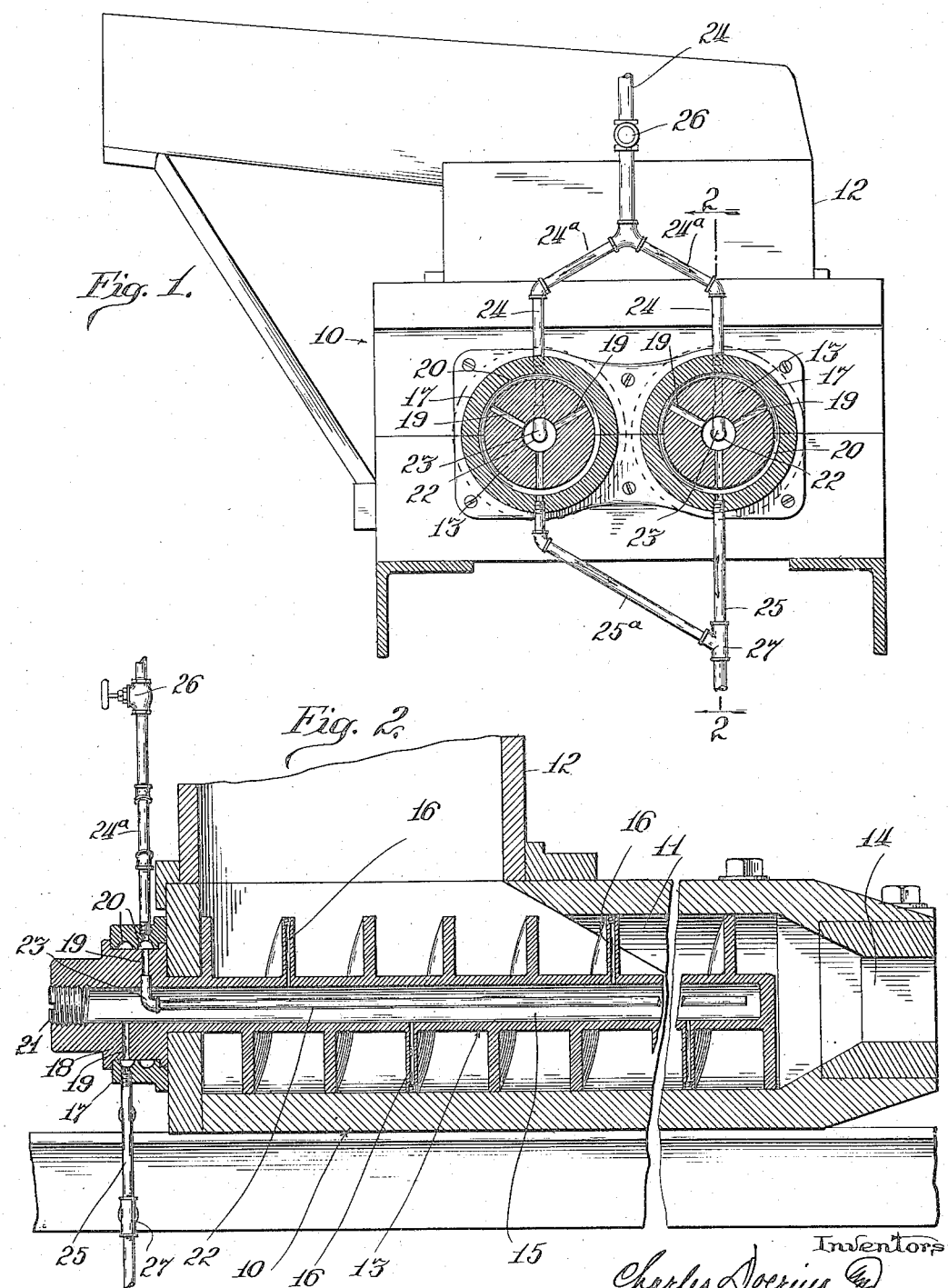

Patented Aug. 12, 1924.

1,504,221

UNITED STATES PATENT OFFICE.

CHARLES DOERING AND HENRY H. DOERING, OF CHICAGO, ILLINOIS.

BUTTER WORKING AND PRINT MACHINE.

Application filed January 23, 1922. Serial No. 531,015.

*To all whom it may concern:*

Be it known that we, CHARLES DOERING and HENRY H. DOERING, citizens of the United States, and residents of Chicago, in the county of Cook and State of Illinois, have invented certain new and useful Improvements in Butter Working and Print Machines, of which the following is a description, reference being had to the accompanying drawings, which form a part of our specification.

Our invention relates to machines for working butter or butter substitutes, to-wit the various crystals or globules of vegetable oils and fats, into a proper consistency and for forming the ingredients into a compressed mass of predetermined cross-sectional configuration from which are formed the desired butter prints.

The invention relates to means whereby the butter or substitute may be more completely as well as more rapidly worked; means being provided whereby the worker element is given the desired temperature which enables the butter or butter substitute to be more thoroughly worked and blended so as to be free from streaks and be of more uniform consistency; the operation of the machine being made more rapid; permitting butter prints to be formed in a shorter period of time after the butter or butter substitute has been properly worked; while at the same time providing an article having a smoother and finer quality than has heretofore been the case.

The objects and advantages of our invention will be more thoroughly comprehended from the detailed description of the drawings, wherein:—

Figure 1 is an end elevation, partially in section, of a butter worker or print machine employing our invention.

Figure 2 is a sectional view taken on the line 2—2 of Figure 1 looking in the direction of the arrows.

Figure 3 is a longitudinal sectional view of the working unit illustrating a modified form of our invention.

Figure 4 is a vertical sectional view taken on the line 4—4 of Figure 3 looking in the direction of the arrows.

Figure 5 is a perspective view of one of the kneader elements or beaters.

In the particular exemplification of the invention as disclosed in Figures 1 and 2, our improvement is shown applied to a butter worker, or print machine, which consists of a body portion 10, composed of suitable material, and provided, preferably, with a pair of longitudinally disposed and parallelly arranged channels 11, having communication at one end with the receiving hopper 12 whereby the material is fed into the channels. Where a pair of longitudinally disposed channels are employed they are preferably arranged so as to communicate with each other at a point substantially parallel with the longitudinal axes of said channels and each channel in turn is provided with a screw or worm indicated at 13 having spirals of predetermined pitch so as to properly engage with and work the butter or substitute ingredients and cause the same to travel toward the delivery end of the machine, where the mass is compressed by means of a restricted and preferably regulable discharge orifice 14. Each worm is journaled in the end wall at the hopper-end of the machine, as clearly shown in Figure 2, with the outer end of the worm provided with any suitable means for rotating the same.

One feature of our invention consists in providing the body or spindle portion of the worm with a chamber 15 extending preferably throughout the length thereof as shown in Figure 2; while the spirals of the worm, at predetermined distances apart, are provided with passages 16 leading from the chamber 15 to a point slightly removed from the tips, namely to a point adjacent the outer perimeter of the spirals, thereby providing the different "turns" of the thread or spiral with passages arranged in communication with the chamber 15.

The outer end of the spindle or body portion of the worm 13 is shown provided with an enlargement which is externally formed with a circumferential groove adapted to receive a collar or member 17; the member 17 being arranged in the groove in such manner as to provide a water-tight connection therewith while at the same time permitting rotation of the worm as the member 17 remains stationary. The enlarged end or hub 18 of the worm is provided with a number of radially disposed ports 19 communicating with the chamber 15 and arranged in spaced relation lengthwise of the hub, while the collar member 17 is shown provided with a pair of grooves on the inner perimeter thereof at points adapted to register with the radially disposed ports 19. The outer end of the chamber 15 is closed in any suitable manner, as for example by a screw-plug 21, Figure 2, which permits ready access to be had to the chamber when occasion requires. The chamber 15 is provided with a conduit 22 extending lengthwise of the chamber to a point in close proximity with the inner closed end of the worm. One end of the conduit 22 is provided with a suitable coupling 23 which may be threaded into one of the ports 19, namely what may be said to be the inlet port. The collar or member 17, in turn, is provided with a port connecting with each annular groove 20; one of the ports being provided with an inlet pipe 24, while the other port in the collar or member 17 is provided with an outlet pipe 25. The pipe 24 is intended to lead from a suitable source of hot water or other heating medium supply; and is provided with a suitable valve 26 for controlling the flow of water therethrough; while the pipe 25 is adapted to discharge the water from the chamber 15 and convey it to any suitable point and in turn is also provided with a valve as at 27 for controlling the outflow. With this arrangement, it is apparent that a constant circulation of properly heated water may be had through the worm to maintain it at the desired temperature.

As is clearly evident from the construction shown, hot water or other suitable liquid may be introduced into the worm 13 by means of pipe 24 through the port in the collar or member, which allows the fluid to enter the correlated annular channel 20, from whence it will flow through a port 19 and connection 23 into conduit 22 and thereby discharged at the opposite or inner end of the worm. With this arrangement, the water will completely fill the chamber 15 throughout the length of the worm and also enter the orifices or passages 16 arranged at predetermined points in the spirals or threads of the worm, thereby substantially heating the entire worm to the desired temperature. In order to maintain the desired temperature, or for the purpose of completely discharging the fluid from the worm, the valve 27 in the outlet pipe may be opened, causing a constant circulation of hot water through the worm, as the water will flow from chamber 15 through the port or ports 19 arranged in alignment with the annular groove 20 which communicates with the outlet pipe 25.

It has been found in practice and more especially in connection with working and blending machines of the character referred to, that the temperature of the worm is of great importance, especially where the portions of butter, or ingredients constituting the butter substitute, are comparatively hard, in which condition it is difficult to properly or completely work and blend the material. We have found that by heating the worm to a proper temperature, the butter or butter substitute is thereby not only softened, so that less friction is provided, permitting a complete and thorough kneading of the material, but at the same time enabling the material to be so worked that it will be absolutely free from all color streaks and a much smoother and finer quality of butter thereby provided. It has also been found in practice that the operation of the machine is made more rapid; as the material is caused to be more quickly passed through the machine; which, in the case of butter or a butter substitute, permits the production of butter prints in a materially shorter period of time than has heretofore been the case. In machines of this character, it is preferable to provide a pair of parallelly arranged channels leading from a common hopper to a common delivery end or orifice, with each channel provided with a worm of similar construction as shown in Figure 1, and for that reason we show the supply pipe 24 provided with the branches $24^a$, $24^a$ leading to the proper port in the collar or hub member 18 of each worm; while the outlet pipe 25 is likewise branched as shown at $25^a$, thus avoiding a multiplicity of pipes and at the same time enabling both worms to be similarly tempered or heated.

In Figures 3 to 5, we illustrate a modified form of the invention, wherein the delivery end of the casing or body portion 10 of the unit is provided with a plurality of perforated members or plates 28 arranged in suitable spaced relation as shown and preferably with the perforations of the succeeding plates, namely from the worm containing portion of the casing toward the delivery end thereof, made gradually smaller as shown in Figure 3; the respective plates causing the butter or butter substitute to be divided into a plurality of comparatively small portions of vermicular form. The adjacent end of the screw or worm $13^a$ is shown provided with a threaded aperture to receive the threaded end of an extension 29, which is preferably angular in cross-section and of length sufficient to extend to the outermost plate 28. At points intermediate of the respective plates, the extension 29 is provided with kneaders or paddles 30, each of which is provided with a hub portion 31 disposed to opposite sides of the paddles or kneaders and made circular in cross-section to extend into enlarged circular openings in the respective plates 28. The hub portions 31 of the respective kneader elements or paddles are shown arranged in abutting relation for the purpose of maintaining a spaced relation between the kneaders or paddles and the perforated plates; the hub portion of the innermost kneader element or paddle 30 being shown in abutting relation with the adjacent end of the worm or screw 13ª. The kneader elements or paddles are preferably in slight spaced relation with the plates so as not to have a shearing effect, but merely to intermix the vermicular portions, and the paddles are substantially of equal cross-sectional dimensions throughout and adapted to extend into close proximity with the side walls of the channels within the casing or housing. As is apparent from the construction shown and described, the kneader elements 30 are forced to rotate with the screw or worm, (the perforated plates 28 being maintained stationary) thus causing the kneader elements or paddles to act upon and commingle the finely divided or vermicular portions issuing through the perforated plates, with the result that a thorough mixing and blending is obtained.

By causing the material, under the pressure resulting from the screw or worm, to to be forced through the respective plates and subjecting the multiple of vermiform particles to the action of the rotating paddles or kneader elements, a thorough kneading or working of the material is effected and a butter or butter substitute of more uniform consistency is provided. Furthermore, with the screw or worm heated to a proper temperature, the material will offer less resistance and therefore less friction is encountered in the operation of the machine, with the result that production is not only increased on account of the smooth rapid action, but at the same time a smoother and finer quality of butter or butter substitute—free from all streaks—is produced than has heretofore been the case; the construction at the same time enabling the worked butter or butter substitute to be subsequently passed through the print machine with a less lapse of time following the operation of the working unit, namely after the butter or butter substitute has been produced.

We have shown and described the worm chambered and provided with a conduit for conducting hot water therethrough, but it is apparent that the construction will permit the employment of any suitable means for heating the worms, as the heating element may not only be disposed throughout the length of the spindle or body portion, but also into the spirals; the constructions shown being deemed the simplest and best adaptations of our invention, which have been described in terms of description and not as terms of limitation, as structural modifications are possible and may be made without, however, departing from the spirit of our invention.

What we claim is:—

1. In a machine of the character described, provided with a chamber, a worm rotatably mounted in said chamber, means disposed at the delivery end of the worm whereby the material operated on is divided into a plurality of small vermicular portions, and means rotatably mounted in the path of said vermicular portions whereby a thorough commingling of the portions is effected.

2. In a machine of the character described and provided with a chamber adapted to receive the material at one end thereof, while the other end constitutes a delivery end, a worm rotatably mounted in said chamber whereby the material is forced toward the delivery end of the chamber, a plurality of perforated plates arranged in spaced relation at the delivery end of said worm whereby the material is divided into a plurality of vermicular portions, and a plurality of kneader elements rotatably mounted intermediate of said plates whereby a commingling of the vermicular portions is effected.

3. In a machine of the character described, a rotatably mounted worm, a plurality of perforated plates arranged in spaced relation at the delivery end of the worm, and kneader elements arranged intermediate of said plates in spaced relation therewith and adapted to rotate with said worm.

4. In a machine of the character described, a rotatably mounted worm, a plurality of perforated plates arranged in spaced relation at the delivery end of the worm, an extension removably secured to the worm and disposed through said plates, and a plurality of kneader elements or paddles secured to said extension so as to rotate therewith and be disposed intermediate of the respective plates.

5. In a machine of the character described, a rotatably mounted worm, provided with a heating medium receiving chamber disposed lengthwise thereof with ramifications extending into the spirals of the worm, a plurality of perforated plates arranged in spaced relation at the delivery end of the worm, with the perforations of the succeeding plates decreasing in size toward the delivery end of the machine, an extension having threaded relation with the worm and disposed through said plates, and a plurality of kneader elements or paddles secured on the extension to rotate therewith and be disposed intermediate of said plates in slight spaced relation therewith.

6. In a machine of the character described, a rotatably mounted worm, an extension removably secured to the delivery end of the worm so as to rotate therewith, and kneader means mounted on said extension so as to rotate therewith.

7. In a machine of the character described, a rotatably mounted worm, a plurality of perforated plates arranged at the delivery end of the worm with the perforations in the succeeding plates decreasing in size, an extension threaded into the end of the worm so as to rotate therewith and disposed through said plates, and a plurality of kneader elements or paddles having extended hubs for maintaining said elements in spaced relation with the respective plates.

8. In a butter working and print machine provided with a longitudinally disposed working chamber, a feed screw rotatably mounted in the working chamber, the spindle portion of the screw being provided with a chamber disposed lengthwise throughout the spindle portion, one end of the said screw being rotatably mounted in and disposed through a side wall of the chamber, the outer end of the screw spindle being provided with a pair of radial ports, a non-rotating member provided with a pair of annular grooves on its inner perimeter adapted to register with said radial ports and having openings from said grooves to the member exterior adapted to receive a supply pipe and a discharge pipe, respectively, and a conduit within the chamber in the screw spindle, connected at one end with the inlet port and extending lengthwise within the screw with a discharge opening at the inner end of the chamber in the screw spindle.

9. In a butter working and print machine provided with a working chamber, a feed screw rotatably mounted in the working chamber and provided with a hollow body or spindle and a plurality of radially disposed passages leading from the interior of the body or spindle portion to a predetermined extent into the spirals of the screw, one end of the screw being disposed through the wall of the chamber and enlarged, the enlarged portion being provided with radial ports, a conduit within the screw spindle leading from one of said ports lengthwise within the spindle and discharging at the opposite end, a collar mounted on said enlarged ported end of the screw against rotation, said collar being provided with annular grooves on its interior and a radial port leading from each groove to the collar exterior, a heating medium conduit connected with one of the ports in the collar, and a discharge conduit connected with the other port in said collar.

10. In a butter working and print machine provided with a pair of parallelly disposed channels, a feed screw rotatably mounted in one end wall of each channel, the spindle or body portion of each feed screw being provided with a chamber extending throughout the length thereof and having passages extending into the spirals of the feed screw, one end of the spindle of each feed screw being provided with an enlargement or hub, each enlargement or hub being provided with a pair of radially disposed ports, a member secured about the enlargement or hub and having a pair of annular grooves or channels on the inner perimeter thereof at points registering with the ports in the feed screw enlargement or hub, a water supply line provided with ramifications connecting with one channel or groove in each member, and an exhaust conduit connected with the other groove of each member for conveying the fluid from the chamber in the feed screws.

11. In a butter working and print machine provided with a working chamber terminating in a print forming discharge, a feed screw disposed lengthwise of the chamber with one end of the spindle of said screw rotatably mounted in the end wall of the chamber, the spindle of the feed screw being chambered throughout its length and having radial ports extending into the spirals of the screw, and means extending lenthwise within the spindle of the screw whereby the latter may be heated.

CHARLES DOERING.
HENRY H. DOERING.

Witnesses:
JOHN H. BAUMGARTNER,
B. AMONDSEN.